United States Patent
Schmitt

(10) Patent No.: US 6,732,036 B2
(45) Date of Patent: May 4, 2004

(54) METHOD AND APPARATUS FOR CONTROLLING A DRIVE UNIT

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/828,076

(22) Filed: Apr. 6, 2001

(65) Prior Publication Data

US 2002/0045979 A1 Apr. 18, 2002

(30) Foreign Application Priority Data

Apr. 6, 2000 (DE) .......................... 100 17 281

(51) Int. Cl.$^7$ .............................. H02P 7/00; B60T 8/58
(52) U.S. Cl. .................. 701/51; 303/186; 303/187; 303/143; 318/434; 318/432; 318/254; 188/181 C
(58) Field of Search .................. 701/51; 303/150, 303/190, 186, 187, 143; 318/432, 254, 811, 434; 180/197; 188/181 C

(56) References Cited

U.S. PATENT DOCUMENTS

| | | | | |
|---|---|---|---|---|
| 4,823,925 A | * | 4/1989 | Ohkumo et al. | 192/0.076 |
| 5,511,867 A | * | 4/1996 | Luckevich et al. | 303/191 |
| 5,634,699 A | * | 6/1997 | Ichikawa et al. | 303/150 |
| 5,994,859 A | * | 11/1999 | Deng et al. | 318/432 |
| 6,193,628 B1 | * | 2/2001 | Hrovat et al. | 477/3 |
| 6,199,536 B1 | * | 3/2001 | Flinspach et al. | 123/399 |
| 6,220,221 B1 | * | 4/2001 | Flinspach et al. | 123/370 |

* cited by examiner

Primary Examiner—Thomas G. Black
Assistant Examiner—Tuan C To
(74) Attorney, Agent, or Firm—Kenyon & Kenyon

(57) ABSTRACT

A method and an apparatus for controlling a drive unit, in which, when drivetrain oscillations are present, a reduction of the torque takes place until they have decayed. In addition, the torque value at which the oscillations occurred is stored. If the torque exceeds that value, a limitation of the rise in the torque is accomplished.

3 Claims, 4 Drawing Sheets

METHOD AND APPARATUS FOR CONTROLLING A DRIVE UNIT

FIELD OF THE INVENTION

The present invention relates to a method and an apparatus for controlling a drive unit of a motor vehicle.

BACKGROUND INFORMATION

In the context of the control of drive units, oscillations occur in the drivetrain in certain operating situations, in particular due to the elasticity of the shafts, and considerably limit the comfort of the vehicle. The oscillations are transmitted to the bodywork, where they result in unpleasant bucking phenomena. One example of these operating states is a load change, for example when pressure on the accelerator pedal is decreased or increased. In the latter case the oscillations have a particularly comfort-impairing effect.

A number of methods are known from the existing art for determining whether such oscillations are present. One example that may be cited here is the method described in German Published Patent Application No. 195 16 120, according to which the presence of drivetrain oscillations is detected by a frequency analysis on the basis of the speed at the differential of the drive axle. In this existing art, the comfort-impairing effects of the drivetrain oscillations are reduced by influencing the activation times of brake pressure control devices.

Also known are actions with which the oscillations that occur are counteracted by intervening in the control system of the drive unit of the vehicle (so-called anti-bucking functions). One example of such a function is known from German Published Patent Application No. 195 23 898. In this, the occurrence of an oscillation is detected by analyzing the engine speed profile; and by influencing the torque of the drive unit, in particular by ignition angle adjustment, the oscillations are counteracted so that the oscillation amplitude is diminished and ideally the oscillation is entirely suppressed. These actions do effectively diminish the oscillations and thus improve vehicle comfort, but the oscillation is simply controlled out without addressing the cause of the oscillations.

German Published Patent Application No. 197 34 112 discloses a method and an apparatus for drive slip control in which, outside the drive slip control context, a maximum drive output torque that can be transmitted to the road in the given circumstances is calculated on the basis of resistance torques, etc.; and if a tendency to slip occurs at at least one drive wheel, the torque of the drive unit of the vehicle is reduced in such a way that the maximum transmittable drive output torque is implemented.

SUMMARY OF THE INVENTION

The limitation or reduction, according to the present invention, in the torque of the drive unit of the vehicle when oscillations occur effectively suppresses those oscillations and thereby improves vehicle comfort. By way of the reduction in torque by correspondingly influencing the setpoint for controlling the drive unit, which depends substantially on the driver, the cause of drivetrain oscillations is influenced. This is because drivetrain oscillations occur as a function of driver behavior when the driver performs a load change, and in particular accelerates by rapid actuation of the accelerator pedal.

It is advantageous that the reduction is performed until the oscillations decay, so that laborious actions that react to individual oscillations can be dispensed with.

It is particularly advantageous that the setpoint value at which the oscillation has occurred is stored; and in a later situation, when that value is exceeded, a limitation of the torque change is performed even without recognition of a drivetrain oscillation. This effectively prevents the occurrence of oscillations.

DETAILED DESCRIPTION

Figure 1:
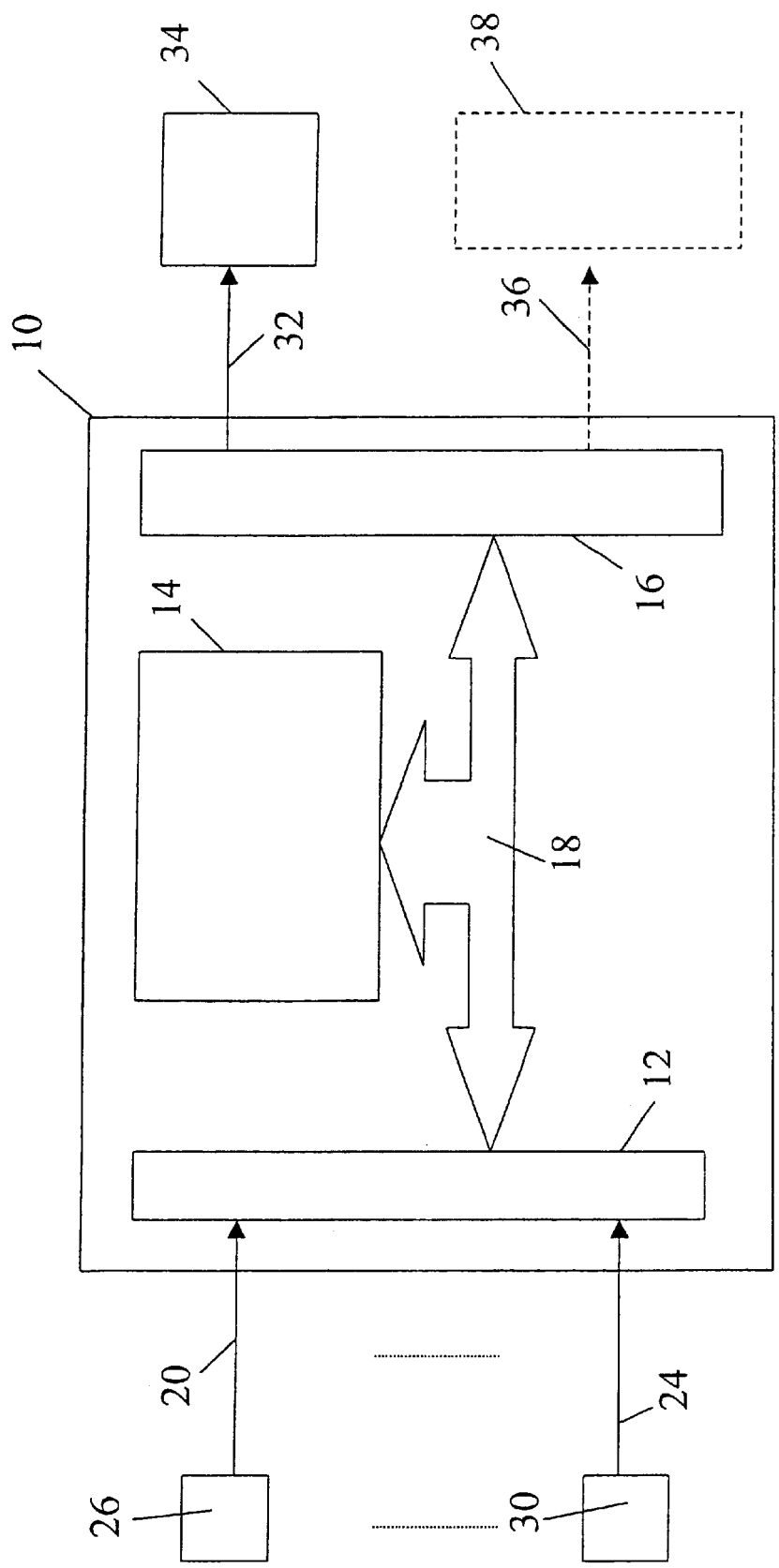
FIG. 1 shows a synoptic block diagram of a control device which influences the torque of a drive unit of a vehicle.

FIG. 1 shows a control unit 10 which includes at least one input circuit 12, at least one microcomputer 14, and at least one output circuit 16. These elements are interconnected by a communication system 18 for mutual data exchange. Input circuit 12 has input lines conveyed to it through which signals, which represent operating variables or from which operating variables can be derived, are conveyed. In the preferred exemplary embodiment, control unit 10 represents a control unit for regulating drive slip; in other exemplary embodiments it is an engine control unit or a combination of the two.

For reasons of clarity, only input lines 20 through 24, through which operating variable signals are conveyed to control unit 10 from measurement devices 26 through 30, are depicted. Such operating variable signals are, for example, signals that represent the driver's input, engine speed and/or output drive speed or wheel speed signals, at least one variable for ascertaining an actual value of an output variable of the drive unit (e.g. torque or power output), and variables from which, for example in accordance with the existing art cited above, the maximum transmittable drive torque is calculated. Depending on the exemplary embodiment, the driver's input in this context is the position of an operating element that is actuable by the driver, from which a setpoint (e.g. torque setpoint) for controlling the drive output is derived, or a variable which itself represents that setpoint.

Via output circuit 16 and the output lines connected thereto, control unit 10 delivers manipulated variables in the context of the control actions performed by control unit 10. In the preferred exemplary embodiment, at least one output line 32 leads to at least one positioning element 34 for influencing the power output or torque of the drive unit of the vehicle. In the preferred exemplary embodiment, positioning element 34 is the throttle valve of an internal combustion engine which is actuated by a corresponding manipulated variable via line 32. In other advantageous exemplary embodiments, the at least one output line 36 is additionally used braking system 38 of the vehicle and/or other operating variables of the internal combustion engine (ignition angle, fuel delivery, turbocharger), and/or to perform interventions in an automatic drive unit.

In the preferred exemplary embodiment, a drive slip control system is implemented in the context of control unit 10. This system calculates, for example in the manner described in the existing art cited above, continuously the vehicle resistance values of the vehicle in a manner consistent with the situation. The sum of the vehicle resistance values yields a maximum torque (drive output torque or engine torque) that can be transferred to the road. In the event of incipient slippage of at least one drive wheel, the engine torque, which is substantially defined by the driver as a function of the torque requested by the driver, is reduced to that maximum transferable torque. In other words, the drive slip controller defines a setpoint for the engine torque or drive output torque; that setpoint assumes a maximum value in the absence of drive slip control, but within the drive slip control system is reduced, upon occurrence, to the maximum transferable torque and is then increased with the aid of an addition function. In the context of the drive unit control system, this setpoint of the drive slip controller is compared to the setpoint defined by the driver, and the lesser of the two values is utilized in each case to control the drive unit.

If the driver presses the accelerator or brings about a load change in some other way, oscillations can occur in the drivetrain as a result of the elasticity of the drivetrain, and can negatively affect vehicle comfort. In order to damp or prevent such oscillations, once the oscillation is detected (detection taking place in this context with the aid of suitable algorithms, for example with the algorithm described in the existing art cited above), the torque M_FV input by the driver is limited to a torque setpoint M_mot_soll if the driver wishes to define more torque than can be maximally transferred. In the preferred exemplary embodiment, limitation is accomplished by defining a corresponding setpoint of the drive slip controller which, because it is lower, is utilized instead of the driver's input value to control the drive unit. In order to damp the oscillation that has occurred, this limiting value is continuously decreased until the oscillations have decayed. If this is the case, in the preferred exemplary embodiment the limiting value is set to a value derived from the maximum transferable torque value, and a torque increase is performed (for example by incrementing the limiting value by a specific value at specific time intervals) until a maximum (usually the driver's input value) is reached or until a control intervention of the drive slip controller occurs. In a preferred exemplary embodiment, the slope of the torque increase, i.e. the magnitude of increase and/or the time intervals, depends on the drive wheel slip, the coefficient of friction, the vehicle speed, and/or the vehicle acceleration. The slope of the torque increase decreases as the wheel slip rises, as the friction decreases, or as the acceleration decreases. The limiting procedure as described is performed whenever drivetrain oscillations have been detected. Preferably the torque defined by the driver is greater than the maximum transferable torque. Also conceivable, however, are applications in which oscillation recognition alone triggers the limiting process.

In order to prevent a drivetrain oscillation from even occurring, one exemplary embodiment provides for storing the torque value at which the drivetrain oscillation occurred. If this torque value is then reached later, a limitation is performed or the torque change is limited so as to decrease its slope. In this fashion even the occurrence of a drivetrain oscillation is prevented, and vehicle comfort is thereby improved.

Figure 2:
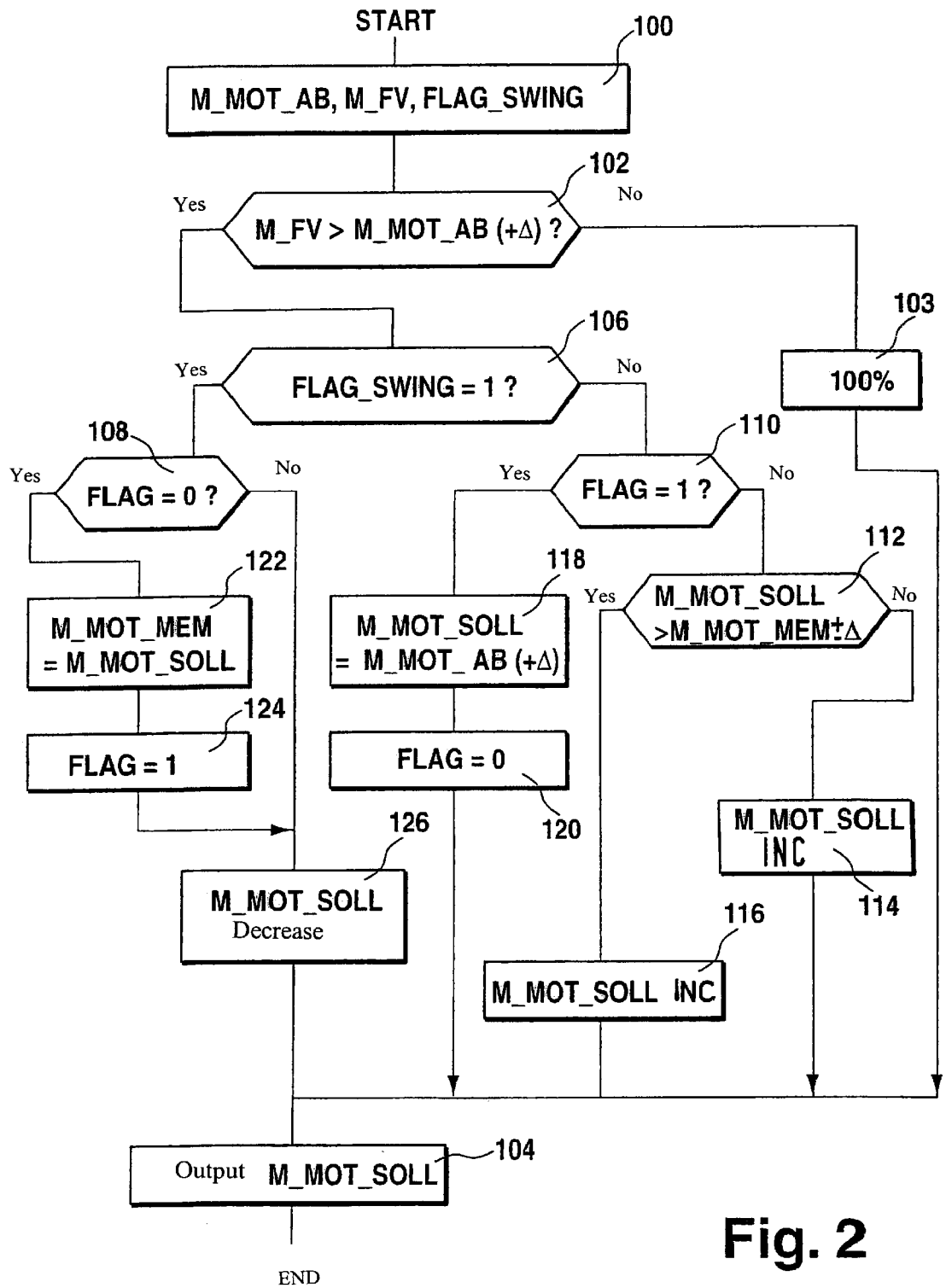
FIG. 2 depicts a preferred embodiment of the function for limiting torque in an oscillation situation and for prevention, as a flow chart which outlines an implementation as a computer program.

FIG. 2 depicts a flow chart which shows a preferred embodiment of the present invention presented above. The program outlined by the flow chart executes in microcomputer 14 of control unit 10.

The program is cycled through at defined time intervals. In the first step 100, the variables that are to be analyzed are read in. These are the maximum transferable torque M_MOT_AB, which is calculated from the vehicle resistance values as presented, for example, in the existing art cited above; the driver's input value M_FV, which is derived from the position of the operating element that is actuable by the driver, and optionally ascertained from further operating variables such as the engine speed; and a flag FLAG_SWING which indicates the presence or absence of drivetrain oscillations. The presence of oscillations is performed, for example, on the basis of the analysis cited above of engine speed signals, or in another known manner. The subsequent step 102 checks whether the driver's input value M_FV is greater than a value (a slightly greater or lesser value) derived from the maximum transferable torque value M_MOT_AB. If it is not, the current torque setpoint M_MOT_SOLL of the drive slip controller is set to its maximum value of 100% (step 103) and is output (step 104). The program is then cycled through again at the next interval.

It should be noted in this context that in addition to the program depicted in FIG. 2, the drive slip control program (not depicted for reasons of clarity) is also active. When the latter program ascertains a torque setpoint as a consequence of a wheel slip, that torque setpoint is output. The program outlined in FIG. 2 is not active during a drive slip control intervention.

If step 102 has indicated that the driver's input value is greater than the comparison value, step 106 then checks whether the flag FLAG_SWING for the presence of oscillations is set, i.e. whether oscillations have been detected. If not, step 110 checks whether a further flag FLAG has a value of 1. This flag indicates whether a drivetrain oscillation has just decayed (value=1) or has not (value=0). If the value of the flag is 0, i.e. if an oscillation was not detected during the previous pass, step 112 then checks whether the current engine torque setpoint M_MOT_SOLL is greater than a stored torque value M_MOT_MEM plus an offset value. If not (i.e. if an oscillation is not present), if the torque value that most recently resulted in oscillations has not been exceeded, and if the driver is inputting a torque that is above the maximum transferable value, then in step 114 incrementing occurs proceeding from the torque setpoint that is set at the moment the maximum transferable torque value is exceeded by the driver's value. That torque setpoint is then output in step 104. The incrementing of the torque setpoint is performed until the driver's value is reached, or until a drive slip control intervention occurs.

If step 112 has indicated that the engine torque setpoint is greater than the stored value, then in step 116, for preventive avoidance of oscillations, the torque setpoint is incremented by a smaller amount, so that the slope of the torque setpoint decreases. In step 104, the torque setpoint ascertained in step 106 is output.

If step 110 has indicated that the flag has a value of 1 (i.e. an oscillation has just decayed), then in step 118 the torque setpoint is set to a (greater or lesser) value derived from the maximum transferable torque value, and in step 120 the flag is set to a value of 0. The setpoint ascertained in step 118 is then output in step 104.

If step 106 has indicated that an oscillation is present, step 108 then checks whether the flag FLAG, which indicates whether an oscillation is currently present, has a value of 0. If the value of the flag is 0, i.e. if the oscillation was detected for the first time in step 106, the torque setpoint M_MOT_

SOLL that is now present is then (in step 122) stored as the memory value M_MOT_MEM, and then in step 124 the flag is set to a value of 1. Step 126, which is also initiated in the event of a No answer in step 108, then follows. In this step, the torque setpoint is decremented, i.e. is decreased a certain amount at each program pass. This torque setpoint is then output in step 104.

Figure 3:
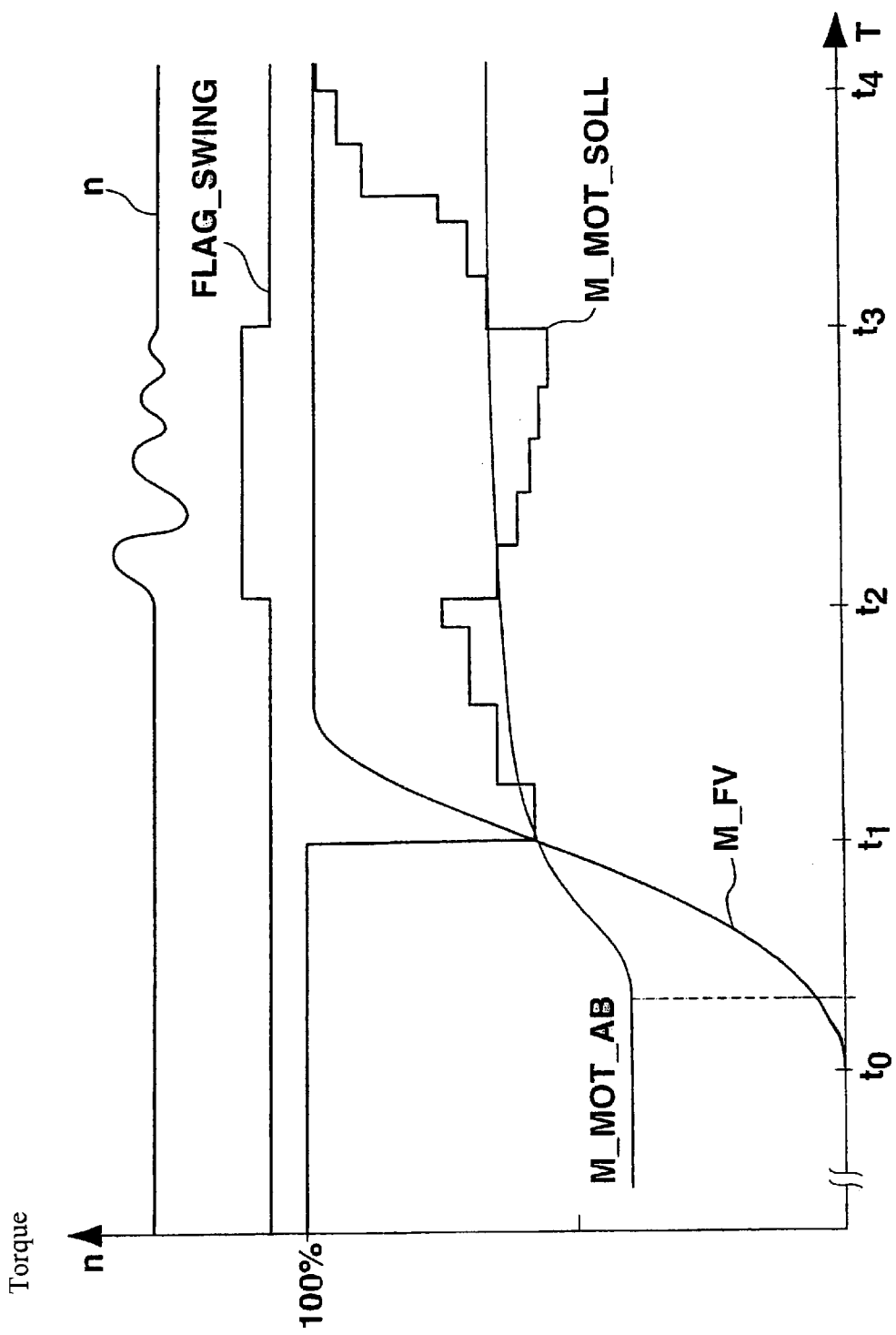
FIG. 3 depicts a first time diagram showing the change over time in signals when the procedure described is utilized.

FIG. 3 depicts, with reference to a time diagram, the manner of operation of the procedure described above. The changes over time in the torque M_MOT_SOLL, the maximum transferable torque M_MOT_AB, and the driver's setpoint value M_FV are plotted. Also plotted is the change over time in the flag FLAG_SWING that indicates oscillation. The change over time in a rotation speed n (e.g. the output drive rotation speed) is plotted at the top to illustrate the drivetrain oscillations. In the context of the procedure described, the term "oscillations" encompasses, as shown, several oscillation periods.

The initial assumption is that from time T0 to time T1, the driver's input value is below the value of the maximum transferable torque. This means that the torque setpoint is held at a value of 100%. At time T1, the driver's input value exceeds the value of the maximum transferable torque. The result is that the torque setpoint is first set to the value of the maximum transferable torque, and then is incremented in predetermined steps and time intervals. At time T2, a drivetrain oscillation is detected. Until that oscillation decays at time T3, a reduction in torque is performed. After the oscillation has decayed at time T3, the torque setpoint is set to the value of the maximum transferable torque, and is subsequently incremented until the driver's input value is reached at time T4. No drive slip control intervention takes place.

Figure 4:
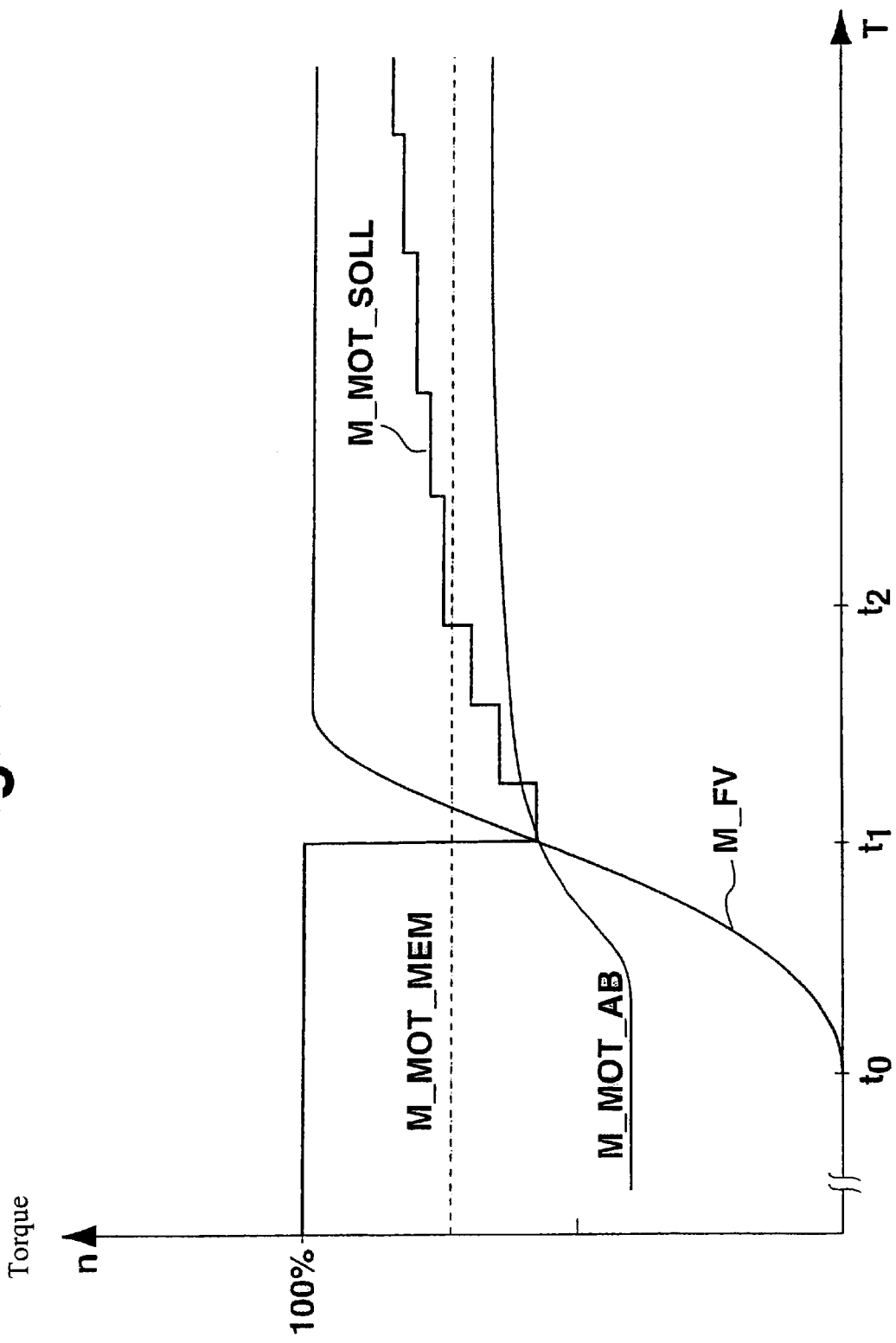
FIG. 4 shows a second time diagram showing the change over time in signals when the procedure described is utilized.

FIG. 4 depicts the procedure for preventive avoidance of oscillations. Here the changes over time in the torque setpoint M_MOT_SOLL, the maximum transferable torque M_MOT_AB, the driver's input torque M_FV, and the stored torque M_MOT_MEM are plotted. Prior to time T1, the driver's input torque is below the maximum transferable torque. At time T1 it exceeds the latter, so that the torque setpoint is set to the value of the maximum transferable torque. In the time period between T1 and T2 the torque setpoint is then incremented as explained above, and at time T2 exceeds the stored value. This results in a diminution of the torque increase, so that the average slope of the torque change becomes less. Drivetrain oscillations are thereby effectively prevented.

The torque of the drive unit is controlled in accordance with the setpoint M_MOT_SOLL that is ascertained. In another exemplary embodiment, engine power output values are defined in addition to the definition of torque values. Engine torque values (combustion torque, clutch torque, etc.) and output drive torque values and power output values are encompassed by the term "output variables of the drive unit."

Depending on the exemplary embodiment, the drive unit is an internal combustion engine or at least one electric motor.

The term "torque" used above is understood to mean, depending on the exemplary embodiment, the indicated torque of an internal combustion engine, the output drive torque of the drivetrain (transmission output torque), or the wheel torque. These variables can be interconverted in known fashion by using further operating variables.

The decrease in the output variable for the duration of the oscillations also encompasses keeping the output variable constant, whereas an increase in the output variable does not occur during this phase.

What is claimed is:

1. A method for controlling a drive unit in which a driver defines a setpoint value for an output variable of the drive unit, comprising the steps of:

determining whether a drivetrain oscillation is present; and if the drivetrain oscillation is determined to be present, reducing the output variable during a duration of the drivetrain oscillation until the drivetrain oscillation has decayed;

wherein an increase in the output variable is dependent on at least one of a slip, a coefficient of friction, a vehicle speed, and an acceleration.

2. A method for controlling a drive unit in which an output variable of the drive unit is controlled on the basis of a setpoint value defined by a driver, comprising the steps of:

ascertaining a maximum transferable value for the output variable; and storing a value of the output variable at which a drivetrain oscillation occurs, wherein:

one of a first limitation and a second limitation of a change in the output variable occurs if the output variable exceeds the stored value, the second limitation having a larger value than the first limitation.

3. An apparatus for controlling a drive unit, comprising:

a control unit for controlling an output variable of the drive unit on the basis of a setpoint value defined by a driver;

an arrangement for ascertaining a maximum transferable value for the output variable;

a storage arrangement for storing a value of the output variable at which a drivetrain oscillation occurs; and a limiting arrangement for performing one of a first limitation and a second limitation of a change in the output variable if the output variable exceeds the stored value, the second limitation having a larger value than the first limitation.

* * * * *